Jan. 6, 1942.   W. C. ROSBOROUGH   2,269,320
RETRACTABLE TOOL HOLDER
Filed April 18, 1938
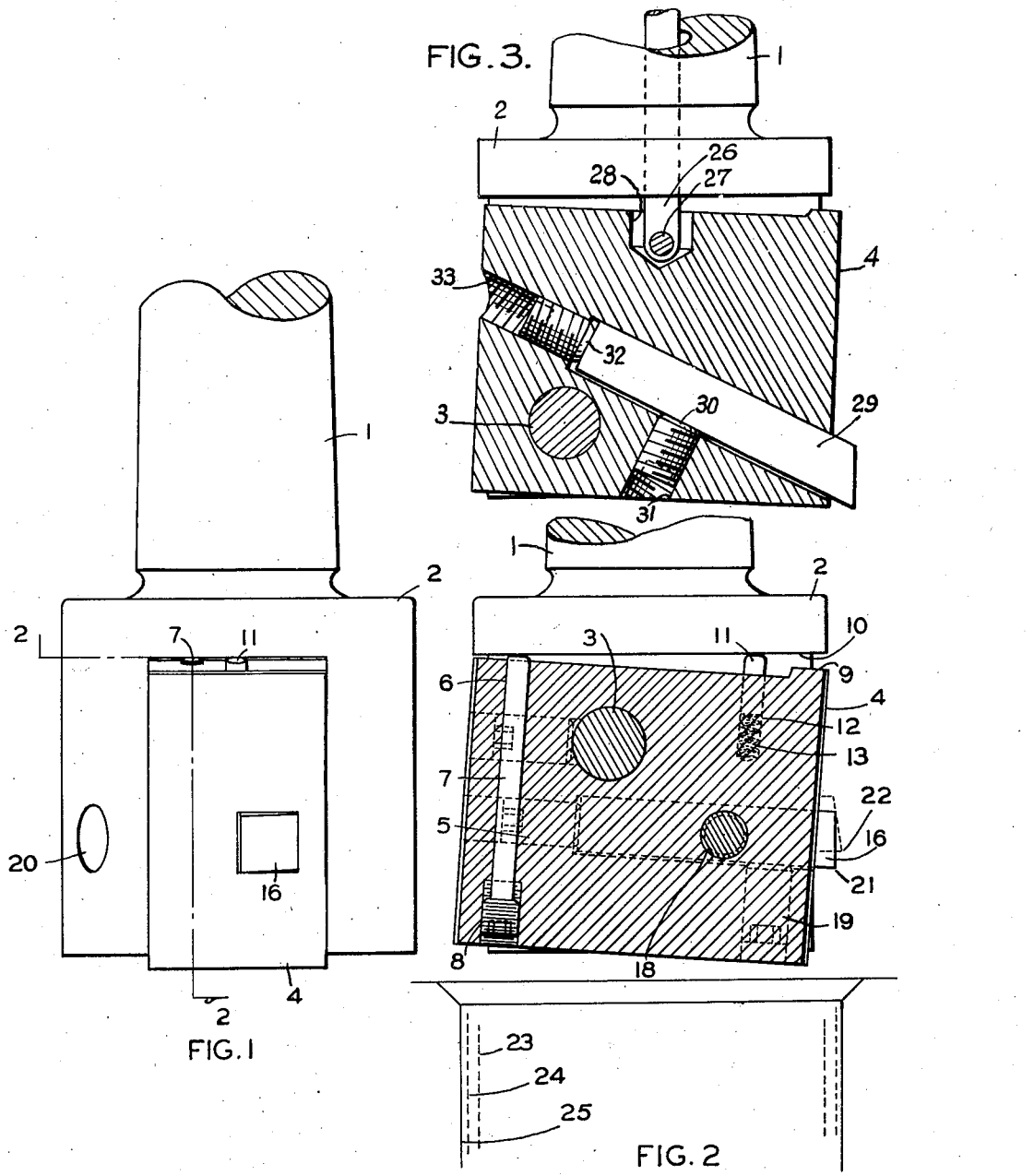

Patented Jan. 6, 1942

2,269,320

UNITED STATES PATENT OFFICE 2,269,320

RETRACTABLE TOOL HOLDER

William C. Rosborough, Moline, Ill., assignor to Moline Tool Company, Moline, Ill., a corporation of Illinois Application April 18, 1938, Serial No. 202,618

2 Claims. (Cl. 77—58)

The present invention relates to means for holding tools in machining surfaces that are generated by closely spaced cuts. The surfaces may be flat, cylindrical or conical, external or internal. An example of an internal cylindrical surface is the bore of a cylinder block.

The object is to support the tool on a tool head so that the tool is rigidly held while cutting but, on completion of the cut, may be withdrawn from the cutting position to a contracted position permitting the cross feed to be reversed without injury to the surface.

Another object is to provide a boring tool which may be set for a given bore and which will automatically contract on completion of the cut, permitting the withdrawal of spindle and tool, the spindle still revolving, without marring the finish of the bored cylinder, and yet will expand to the original setting on boring the next cylinder.

A further object is to so support a tool in a tool head that it will automatically assume a contracted position when not prevented from so doing by the stock to be machined away. When the machining is completed, the tool assumes the contracted position.

A further object is to support the tool in a tool holder pivoted in the tool head for motion crosswise to the line of the cut, a large angular motion of the tool withdrawing the tool but slightly from the surface being machined, less than the depth of the cut being taken.

A further object is to support a tool in a tool head with limited freedom to move across the line of the cut, means tending to move the tool crosswise against the material to be removed on the next cut.

A further object is to provide a tool holder movable in a tool head, adjustable stops limiting the movement of the tool holder relative to the head to permit adjusting the clearance of the tool.

A further object is to provide a boring tool head carrying a diametrically placed tool holder pivoted to the side of the spindle axis opposite to the cutting tool wherein gravity or a spring will cause the tool holder to drop downward when the cut has been completed.

The resistance of the cut being taken will force any cutting tool back against its supporting tool head away from the cut. It will also force it sideways since the tool is cutting not only on its tip but largely on one side edge.

If the tool is supported rigidly against movement in either of these directions the tool head must be lifted from the surface being machined before the back stroke takes place to avoid marring the surface already machined. In doing so the precise setting is apt to be lost.

In boring holes the tool is usually rigidly mounted on the spindle and the revolving cutter is gradually fed into the bore until the bore has been cut all the way down into the cylinder. In order to withdraw the spindle the work is frequently mounted on a table having a cross feed. Moving the table will place the spindle eccentric to the hole. The spindle must be stopped in a position where the tool points in the direction the table can move and complicated interlocks are required to stop the tool in this position and to be sure the table comes back just the amount it was moved off center.

By contrast, my invention when applied to boring a hole allows the boring spindle to remain centered over the bore. It never moves laterally while the tool is in the bore or coming out of it. The revolving tool head bores the hole and on completion the tool holder contracts so that, the spindle still revolving, the tool cannot mar the bore while being withdrawn. Thus the tool permits a much simpler method of operating machine tools.

Although illustrated as applied to boring holes I do not wish to limit myself to this use. The invention is equally applicable to other cutting tool mountings.

Figure 1 is a front elevation of one form of my invention.

Figure 2 is a section along line 2—2 in Figure 1.

Figure 3 is a section similar to Figure 2, of a modified form of boring tool.

The tool head 2 has a shank 1 that fits into the boring machine spindle. The tool head is slotted diametrically and a tool holder 4 is pivoted on a pin 3 in the slotted tool head so that the tool holder is supported against circumferential movement relative to the tool head but may move in an axial plane. The movement of the tool holder 4 in tool head 2 is limited in one direction by contact of abutments 9 and 10 on the tool holder and tool head. A pin 7 fits in a hole 6 in the tool holder 4 and the amount by which it protrudes from the tool holder can be regulated as by a set screw 8. Thus the angular motion of tool holder 4 is limited by contact of abutments 9 and 10 on the one hand and pin 7 and tool head 2 on the other hand.

The tool holder carries a tool 16, the cutting edge preferably somewhat below the level of pin 3. The tool 16 may be adjusted by a set screw 5 and locked in place by set screws 18 and 19. To lock the set screw 18 in the tool holder 4 the wrench passes through a hole 20 in tool head 2 of larger diameter than screw 18.

As the tool holder swings, the tip of the tool 18 traces an arc 21 to 22, and the tip of the tool will be furthest from the axis of the spindle when the surfaces 9 and 10, are in contact and the tool is in position 22.

When the tool holder drops to the lower position the cutting edge of the tool, 21, instead of boring a bore 25, traces a circle 24 of a smaller diameter.

It will be noted that movement of the tool holder through a large arc only slightly reduces the bore from 25 to 24.

Thus, by proper adjustment of the pin 7 the maximum movement of tool holder 4 still does not contract the tool enough to permit it to enter the rough bore 23 without contacting the work.

The tool holder 4 may be moved to its contracted position in several ways. A rod 26, (Fig. 3), fastened to a pin 27 in recess 28 may be controlled by mechanism on the boring machine so that it will be in position 21 or 22 at the proper time. Or tool holder 4 may depend on gravity to bring the tool 16 to position 21 when the cut has been finished. Or a pin 11 partly filling a hole 12 in which a spring 13 is also housed may positively rock the tool holder 4 into the position shown in Figure 1 and Figure 2.

Thus, when the boring tool head 2 is revolved by the spindle and fed downward the tool 16, in the contracted position 24, strikes the stock to be removed as the rough bore is only of diameter 23. The tool holder is rocked in one of the ways described until abutment 9 meets 10 and the tool is in position 22. As boring proceeds, the spindle being steadily fed down, the tool 16 cannot assume the position shown in Figures 1 and 2 until it reaches the bottom of the bore.

On completion of the cut the tool holder moves to the position shown. As pointed out this may be the action of gravity, by the small spring 13 always pushing stud 11 against surface 2, or as in Fig. 3, a rod may extend down to the tool holder and the tool holder may, without stopping the spindle, be held always down when it is desired to have the tool retracted and always up when we wish to bore.

Figure 3, already referred to, shows another form of my invention.

A blind hole that does not extend through the piece, or a hole having a shoulder in the bore, may be bored with this tool.

The tool 29 may be mounted at an angle, adjusted by a screw 32 in bore 33 and locked by set screw 30 in bore 31. The movement of the tool holder 4, instead of being controlled by a light spring or gravity is here controlled by an operating rod 26 which is fastened to tool holder 4 by a pin 27 in a recess 28.

Although the foregoing description necessarily describes the preferred form in detail so that the invention may be clearly set forth, it is to be understood that the terminology is not intended to be restrictive or confining and that various rearrangements of parts and modifications of structural detail may be resorted to without departing from the spirit of the invention as hereby claimed. Shown as a boring tool, it is not limited thereto but may be applied to a lathe, planer, shaper or other machine tools as well.

Having described the invention, what is claimed and desired to be secured by Letters Patent is:

1. A boring head comprising a revolving head having a slot extending diametrically thereto; a tool holder pivoted off center in the slot-separated portions of the head, a cutting tool fastened in the end of the tool holder furthest from the pivot, said holder being retractable on its pivot to two alternate positions in one of which the cutter projects further from the boring head axis than in the other, a stop determining the position of the tool holder in the slot when cutting, another stop limiting the retraction of the tool holder to less than the cut taken, the weight of the tool holder carrying the tool to retracted position and the resistance of the cut holding the cutter in its boring position.

2. A boring head comprising a revolving head having a slot extending diametrically thereto; a tool holder pivoted off center in the slot-separated portions of the head, a cutting tool fastened in the end of the tool holder furthest from the pivot, said holder being retractable on its pivot to two alternate positions in one of which the cutter projects further from the boring head axis than in the other, a stop determining the position of the tool holder in the slot when cutting, another stop limiting the retraction of the tool holder to less than the cut taken, means tending to move the tool holder to the more retracted position, the resistance of the cut overcoming the means while boring.

WILLIAM C. ROSBOROUGH.